(12) United States Patent
Ford

(10) Patent No.: US 8,246,223 B2
(45) Date of Patent: Aug. 21, 2012

(54) ILLUMINATING DEVICE WITH ADHESIVE SHROUD

(76) Inventor: Timonthy D. F. Ford, Beaconsfield (CA)

( * ) Notice: Subject to any disclaimer, the term of this patent is extended or adjusted under 35 U.S.C. 154(b) by 123 days.

(21) Appl. No.: 12/780,367

(22) Filed: May 14, 2010

(65) Prior Publication Data

US 2010/0290239 A1 Nov. 18, 2010

Related U.S. Application Data

(60) Provisional application No. 61/178,255, filed on May 14, 2009.

(51) Int. Cl.
*F21V 21/00* (2006.01)
(52) U.S. Cl. .................... 362/397; 362/249.02
(58) Field of Classification Search .................. 362/397, 362/249.01, 249.02, 800, 806, 249.05, 249.06, 362/249.12, 394, 545, 802
See application file for complete search history.

(56) References Cited

U.S. PATENT DOCUMENTS

| | | | |
|---|---|---|---|
| 2,264,477 A * | 12/1941 | Loeffler | 248/205.5 |
| 5,311,417 A | 5/1994 | Heh | |
| 5,315,492 A | 5/1994 | Davenport | |
| 6,648,492 B1 | 11/2003 | Shih | |
| 7,044,622 B2 | 5/2006 | Marshall | |
| 7,246,928 B2 * | 7/2007 | Marshall | 362/397 |
| 7,322,116 B2 * | 1/2008 | Long et al. | 33/286 |
| 2002/0154512 A1 * | 10/2002 | Shy | 362/503 |
| 2005/0201084 A1 * | 9/2005 | Huang | 362/157 |
| 2009/0103317 A1 | 4/2009 | Steck et al. | |

FOREIGN PATENT DOCUMENTS

DE 202008008207 U1 * 9/2008
* cited by examiner

*Primary Examiner* — Hargobind S Sawhney
(74) *Attorney, Agent, or Firm* — Goudreau Gage Dubuc; Hugh Mansfield

(57) ABSTRACT

An illuminating device for attachment to a translucent/transparent surface is disclosed. The device comprises a suction cup comprising an inner adhering surface; and a light source positioned towards a center of the suction cup such that when the inner adhering surface is pressed against the translucent surface, light emitted by the light source propagates through the translucent/transparent surface. There is also disclosed a method for attaching a light-emitting device to a translucent/transparent non-porous surface by developing a suction force.

8 Claims, 5 Drawing Sheets

ILLUMINATING DEVICE WITH ADHESIVE SHROUD

CROSS REFERENCE TO RELATED APPLICATIONS

The present application claims benefit, under 35 U.S.C. §119(e), of U.S. provisional application Ser. No. 61/178,255, filed on May 14, 2009 which is incorporated herein in its entirety by reference.

FIELD OF THE INVENTION

The present invention relates to an illuminating device with adhesive shroud. In particular the present application relates to a portable flashlight or the like and associated shroud which is particularly suited to adhering the flashlight to a flat transparent surface such as a window or the like such that light emitted by the flashlight can be seen through the window.

BACKGROUND OF THE INVENTION

In a variety of circumstances, in particular in cases of emergency were it is wished to signal information to individuals located outside a building about potential dangers within the building, having a signalling device which can be shone through a window, such as a flashing light or the like, can prove very useful. This is particularly true in the case of terrorist attacks and the like where hostages and civilians are involved and the police or other paramilitary forces are hesitant to enter the premises for fear of escalating the situation, and where their knowledge of the position of assailants within the building is not known to those on the outside.

On the other hand, those persons confined to the inside of the building by the assailants may be the only source of knowledge of the location the assailants, for example that they are within their general vicinity, and provided those persons are appropriately equipped to signal information they can be a useful source of information to those located on the outside of the building who are hoping to diffuse the situation. This could be particularly useful in schools or the like where attacks are typically disorganised and assailants and potential victims located through out the school, also typically in rooms which have windows facing the outside. Additionally, such institutions have a staff, such as teachers, who can be trained and equipped appropriately.

On the other hand, recognition by an assailant that information is being transmitted to the outside might serve to escalate the situation with potentially lethal consequences and therefore an approach which hides this activity from the assailant would appear beneficial.

What is needed, therefore, and one aspect of the present invention, is an equipment which can be attached to a window or other transparent or translucent surface an used as a way to communicate information to others located on the other side of the surface using light in a manner which is not visible from the inside. An additional aspect of the present invention is that the equipment can be controlled when it is already installed on the transparent or translucent surface.

SUMMARY OF THE INVENTION

There is disclosed an illuminating device for attachment to a translucent/transparent surface. The illuminating device comprises a suction cup comprising an inner adhering surface and a light source positioned towards a centre of said suction cup such that when said inner adhering surface is pressed against the translucent surface, light emitted by said light source propagates through the translucent/transparent surface.

There is also disclosed an adhesive shroud for securing a portable light source comprising a light emitting head configured for emitting light generally along an axis to a surface. The shroud comprises a flange defining an aperture, said aperture dimensioned to receive the light emitting head therein such that when said flange is attached to the surface the light emitting head is held securely within said aperture.

Further, there is disclosed a method for attaching a portable device comprising a light emitting head to a translucent/transparent non-porous surface. The method comprises providing a flexible flange having a bowl shaped inner surface and defining an aperture towards a centre thereof the positioning the light emitting head within the aperture at a bottom of the bowl shaped inner surface such that light emitted by the device is on the same side of the flange as the inner surface the positioning the portable device such that light emitted by the device is directed through the translucent/transparent non-porous the and developing a suction force between the light emitting head and the non-porous surface by pressing the flexible flange against the non-porous surface.

DETAILED DESCRIPTION OF THE ILLUSTRATIVE EMBODIMENTS

Figure 1:
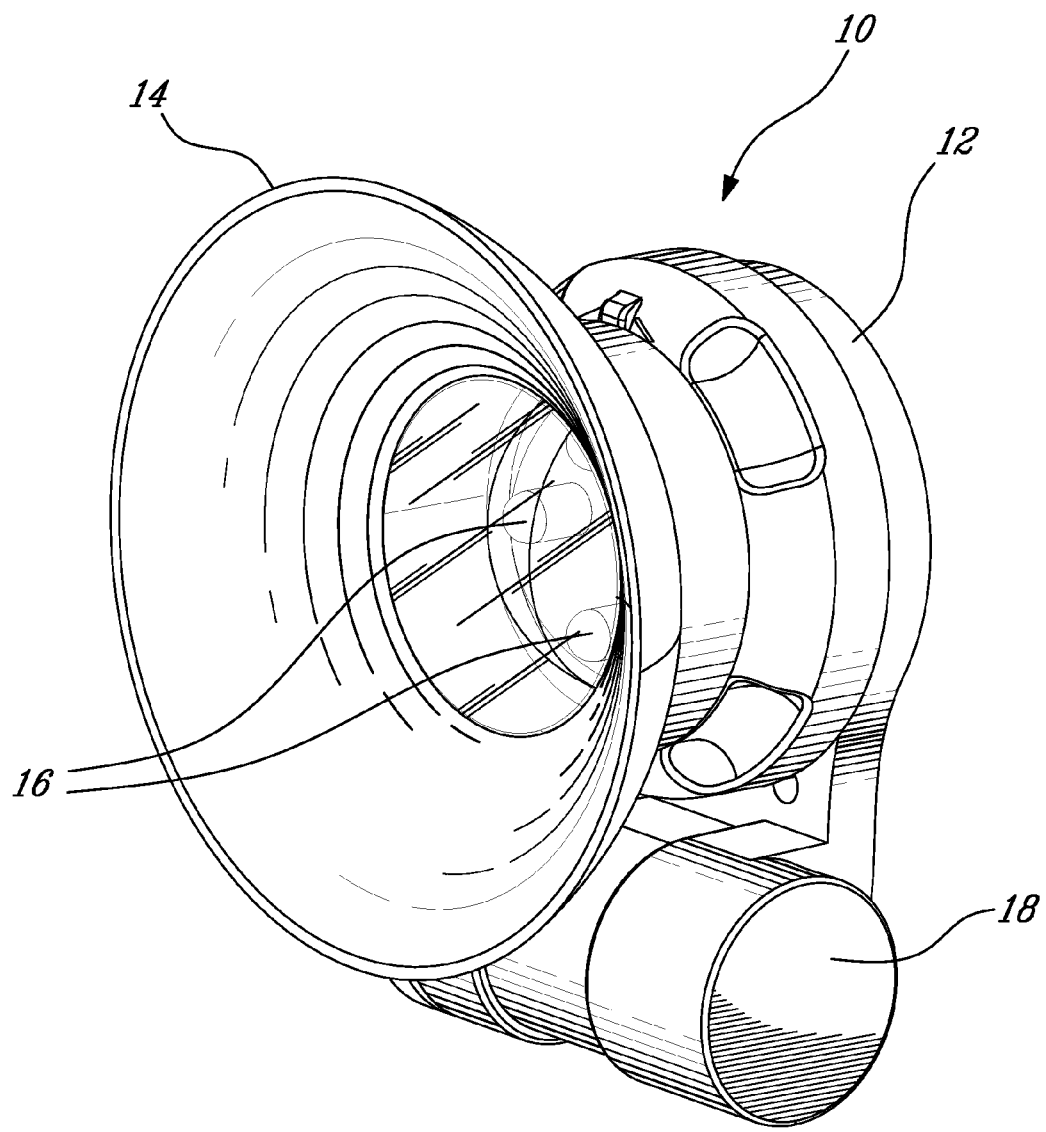
FIG. 1 is a right front perspective view of an illuminating device with adhesive shroud in accordance with an illustrative embodiment of the present invention.

Referring now to FIG. 1, an illustrative embodiment of an illuminating device with adhesive shroud, and generally referred to using the reference numeral 10, will be described. The device 10 is comprised of an illuminating device 12 such as a flashlight or the like and a shroud 14. The illuminating device 12 illustratively comprises at least one source of illumination 16 such as an LED powered by a battery or the like held within a battery compartment 18.

Figure 2:
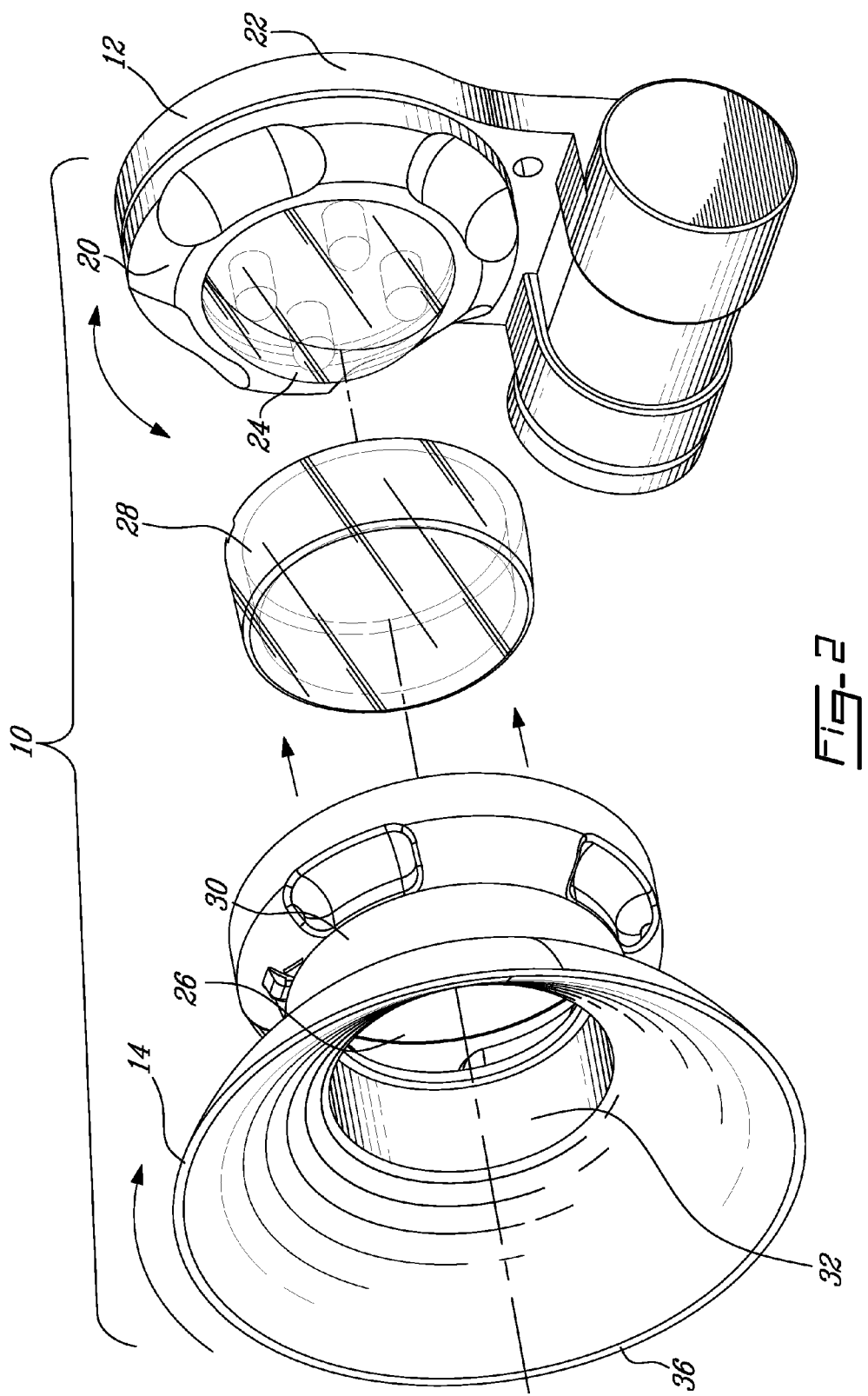
FIG. 2 is an exploded right front perspective view of an illuminating device with adhesive shroud in accordance with an illustrative embodiment of the present invention.

Referring now to FIG. 2, the illuminating device 12 further illustratively comprises a bezel mounted multi-position rotary control switch 20 which is secured to the device housing 22 for rotation about the LEDs 16 via a transparent lens 24 which also acts as a hub around which the rotary control switch 20 rotates. The rotary control switch 20 is used to control power provided by the battery to the LEDs 14 according to one or more control patterns stored within the electronics (not shown) encased within the device housing. For example, in a first position of the rotary switch 20 the LEDs 16 can be turned off. In a second position of the rotary switch 20 only green coloured LEDs 16 may be illuminated either continuously or according to a flashing signature or cycle. In a third position of the rotary switch 20 only yellow coloured LEDs 16 may be illuminated either continuously or according to a flashing signature or cycle. Finally, in a forth position of the rotary switch 20 only red coloured LEDs 16 may be illuminated either continuously or according to a flashing signature or cycle.

Although illustratively four (4) positions have been disclosed, in a particular embodiment 8, 16 or more positions could be provided for with additional signalling functions, colours and the like.

Still referring to FIG. 2, the shroud 14 is illustratively manufactured from a flexible material such as rubber and defines an aperture 26 adapted to fit snugly over the transparent lens 24, which forms part of the rotary switch 20 and rotates therewith. As a result, rotation of the rotary switch 20 leads to rotation of the shroud 14. In a particular embodiment a transparent intermediate sealing lens 28 configured to fit snugly into the aperture 26 can be provided to improve the seal between shroud 14 and illuminating device 12 thereby improving the adhesive force generated by the shroud 14. The shroud 14 further comprises a securing flange 30 moulded to fit snugly over the rotary switch 20, thereby improving the strength of the fit between shroud 14 and device 12.

Still referring to FIG. 2, in an alternative embodiment the intermediate sealing lens 28 could be bonded to form part of the illuminating device 12 about the transparent lens 24, or the transparent lens 24 can simply be replaced by the intermediate sealing lens 28 thus allowing the shroud 14 to be mounted directly on the sealing lens 28, and foregoing the necessity of providing the moulded securing flange 30.

Figure 3:
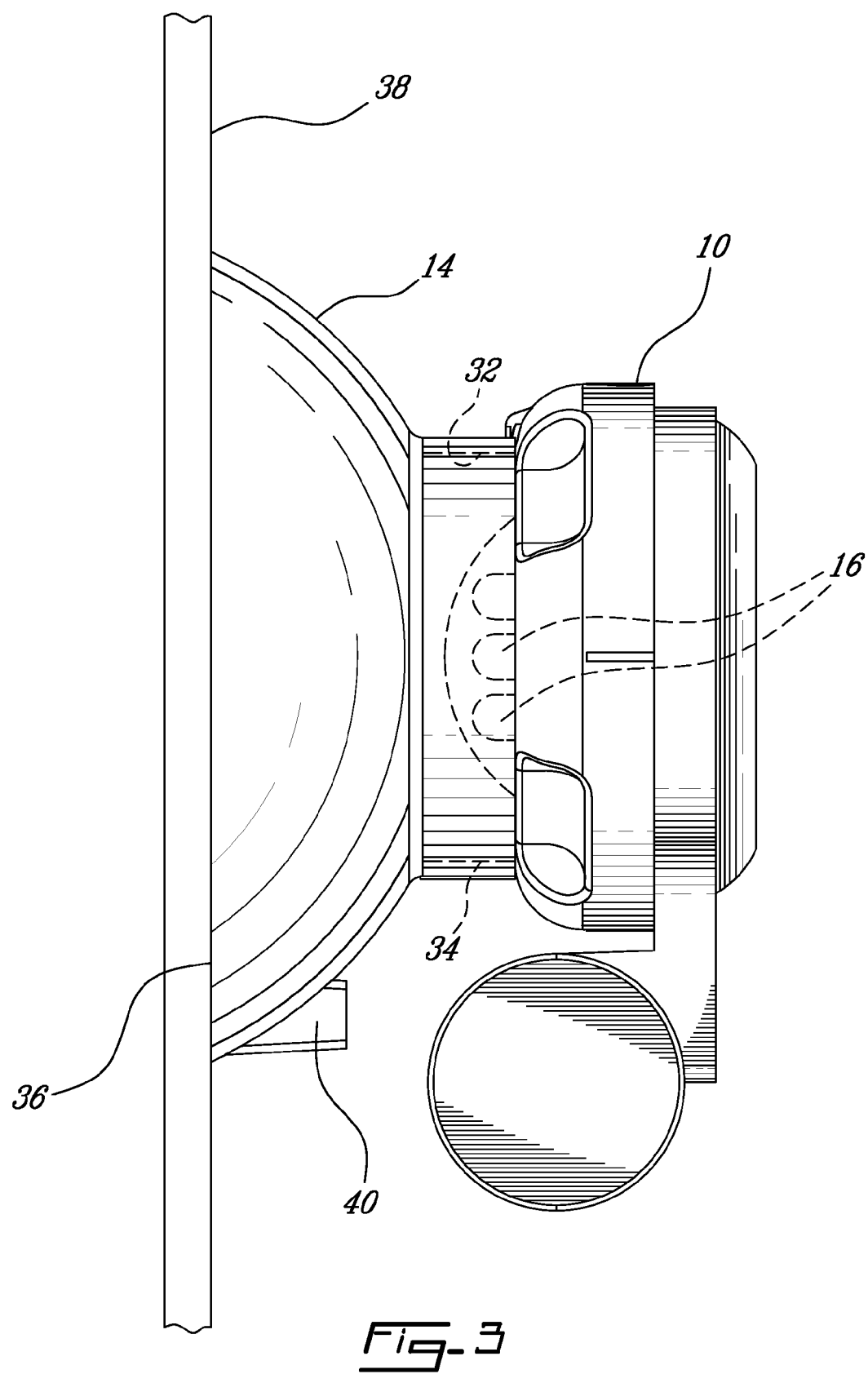
FIG. 3 is side plan view of an illuminating device with adhesive shroud in accordance with an illustrative embodiment of the present invention attached using suction to a transparent flat surface.
Figure 4A:
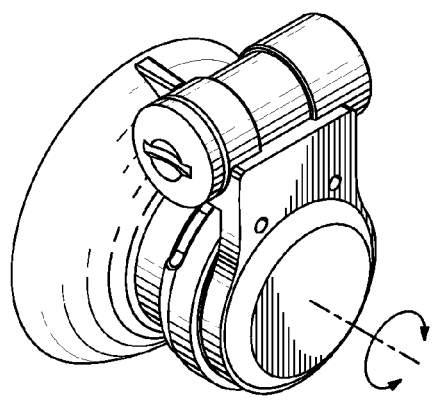
FIGS. 4A through 4D provide raised rear perspective views of an illuminating device with adhesive shroud in accordance with an illustrative embodiment of the present invention.
Figure 4B:
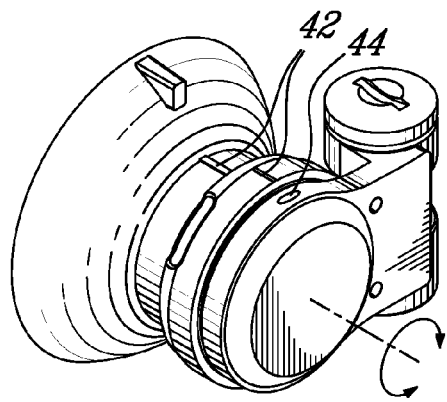
Figure 4C:
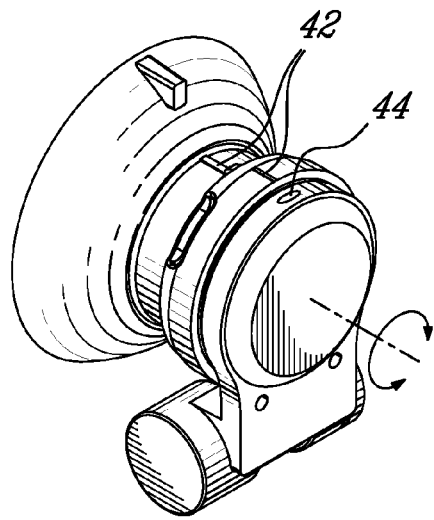
Figure 4D:
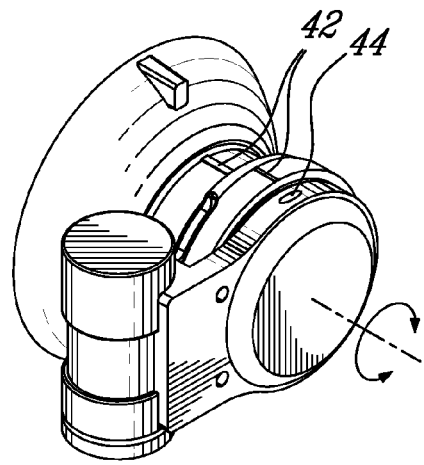

Referring now to FIG. 3 in addition to FIG. 2, on insertion of the intermediate sealing lens 28 into the aperture 26, the inner surface 32 of the aperture 26 forms an airtight seal with the outer surface 34 of the flange 28.

Referring now to FIG. 3, the shroud 14 illustratively comprises a generally bowl shaped flange 36 at an adhering end which is concave and elastic. It will now be apparent to a person of ordinary skill in the art that the shroud 14 together with the illuminating device 12 in the present particular embodiment illustratively forms a suction cup like device which can be easily attached to flat non-porous surfaces by pressing the device 10 against the surface. Therefore, when the illuminating device with adhesive shroud 10 is pressed against a transparent surface 38 such as glass, the shroud 14 will develop suction and retain the illuminating device 12 against the surface 38. Additionally, light emitted by the LEDs 16 will be visible through the glass. Furthermore, as the shroud 14 is attached to and rotates with the rotary switch 20, rotation of the device body 22 causes the rotary switch 20 to move relative to the device body 22 thus allowing the light emitted by the LEDs 16 to be controlled. Given the relatively large width of the concave adhering end 36 of the shroud 14, light emitted by the LEDs 16 is effectively shielded and remains invisible to those located behind the illuminating device.

In order to facilitate release the shroud 14 from the transparent surface 38, a pull tab 40 can be provided.

Referring now to FIGS. 4A through 4D, as discussed above, rotation of the shroud 14 versus the device housing 22 causes the rotary switch 20 to also rotary versus the device housing 22. As a result, when the shroud 14 is adhered to a window or the like, the function of the illuminating device 12 can be changed by simply rotating the device housing 22. However, as discussed above the shroud 14 also serves to hide the light emitted by the LEDs 16 from those positioned behind the illuminating device 12. In order to provide the user with an indication of the particular function which has been selected without the requirement of actually seeing the emitted light, the shroud 14 and illuminating device 12 are equipped with a series of visual indications. In this regard, and referring to FIGS. 4A through 4D the shroud 14 and/or rotary switch 20 are labelled with a flash 42. Similarly, the device body 22 is illustratively labelled with coloured dots 44 which provide an indication of the colour of light and/or signalling pattern which is emitted by the LEDs. For example, FIGS. 4B through 4D would show respectively green, yellow and red dots as in 44 indicating, for example, that respectively green, yellow or red light is being emitted by the LEDs.

In one proposed use of the illuminating device with adhesive shroud 10 as disclosed hereinabove, the colours are used to indicate the assessed danger within the vicinity of the device. For example, red would be used to indicate the presence of assailants in the vicinity of the device. Green, on the other hand, would be used to indicate that the assailants are no longer present in the vicinity or have been otherwise immobilized. Yellow would be used to indicate for example, that the user is unable to assess the danger. Alternatively, alternative colours or flashing signatures or combinations of two or more illuminating devices with adhesive shrouds 10 could be used to indicate the number of assailants in the vicinity, whether or not there are injured in the vicinity, or the like.

Due to it small and handy nature the illuminating device with adhesive shroud 10 can be carried on the person, be quickly assembled and rapidly and surreptitiously installed when called for.

In an alternative illustrative embodiment the illuminating device with adhesive shroud 10 can be attached to a transparent or translucent surface using other means (not shown), such as an appropriate adhesive or the like.

Figure 5:
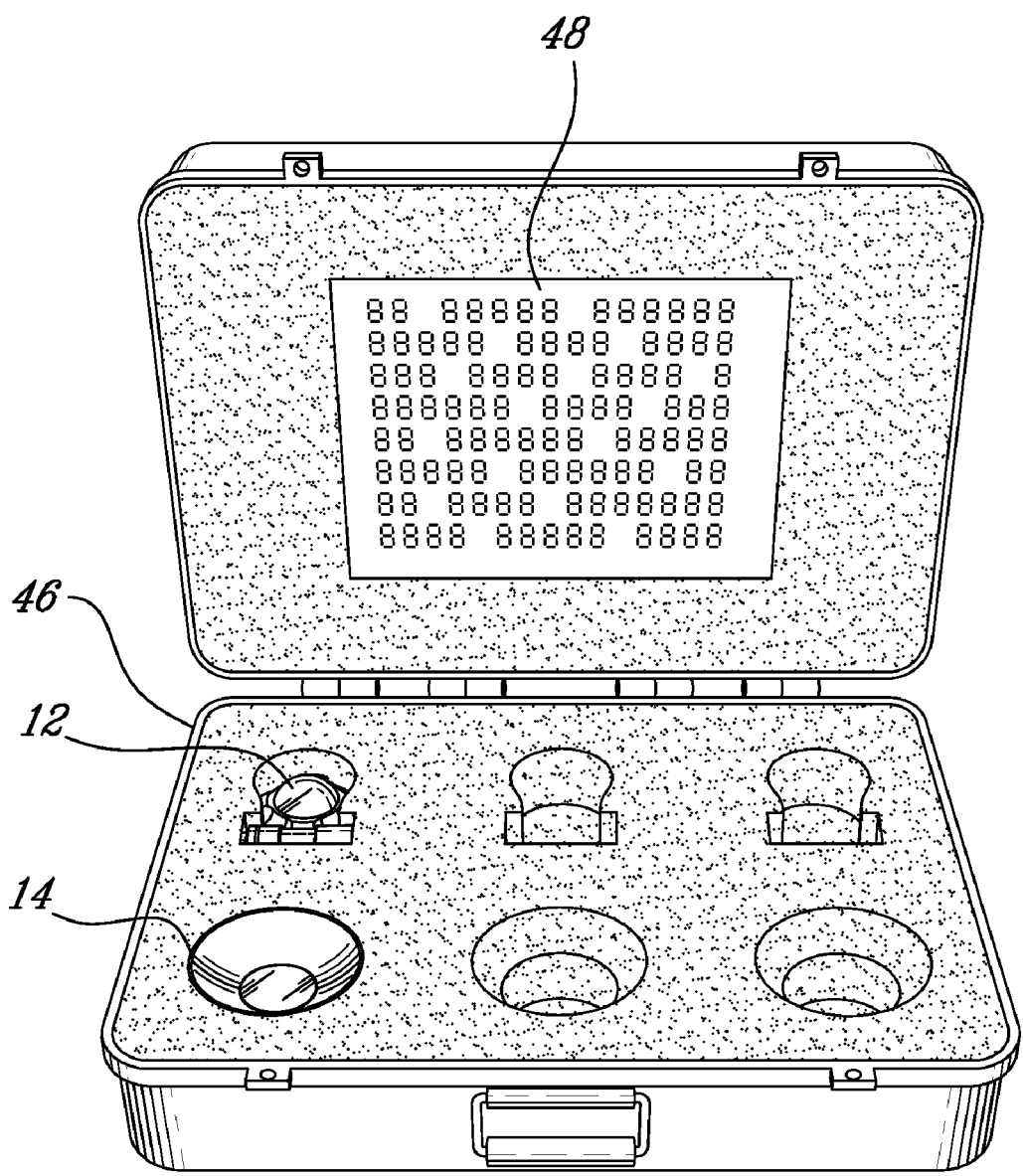
FIG. 5 provides a front raised perspective view of a kit comprising three (3) illuminating devices with three (3) adhesive shrouds in accordance with an illustrative embodiment of the present invention.

Referring to FIG. 5, in a particular embodiment the illuminating device with adhesive shroud 10 could be supplied in a kit form comprising an appropriate container 46 including one or more illuminating devices 12 and one or more shrouds 14 as well as instructions 48 for their use and the like.

Although the present invention has been described hereinabove by way of specific embodiments thereof, it can be modified, without departing from the spirit and nature of the subject invention as defined in the appended claims.

What is claimed is:

1. An illuminating device for attachment to a translucent/transparent surface, comprising:
   a suction cup comprising an inner adhering surface; and
   a light source positioned towards a centre of said suction cup such that when said inner adhering surface is pressed against the translucent surface, light emitted by said light source propagates through the translucent/transparent surface;
   wherein said suction cup and said light source are able to be separated, wherein said suction cup defines a circular aperture towards a centre thereof and further comprises a transparent sealing lens positioned within said aperture, said aperture dimensioned to snugly receive said light source therein.

2. The illuminating device of claim 1, wherein said suction cup and said light source are able to be separated, wherein said suction cup defines a circular aperture towards a centre thereof, said aperture dimensioned to provide an airtight fit when said light source is positioned therein.

3. An illuminating device for attachment to a translucent/transparent surface, comprising:
   a suction cup comprising an inner adhering surface; and
   a light source positioned towards a centre of said suction cup such that when said inner adhering surface is pressed against the translucent surface, light emitted by said light source propagates through the translucent/transparent surface;
   wherein said suction cup and said light source are able to be separated, wherein said light source comprises at least one LED emitting light generally along an axis and a rotary switch mechanism positioned about said LED for rotation about said axis, wherein said suction cup defines a circular aperture towards a centre thereof, said aperture dimensioned to snugly receive said light source therein and further wherein rotation of said light source relative to said section cup causes said rotary switch to rotate accordingly.

4. The adhesive shroud of claim 3, wherein said flange is manufactured from a flexible material.

5. The adhesive shroud of claim 3, wherein said flange is generally bowl shaped and said aperture is generally circular. pg,12

6. The adhesive shroud of claim 3, wherein said flange is manufactured from an opaque material.

7. The adhesive shroud of claim 3, wherein the surface is non-porous, wherein said flange is generally bowl shaped and manufactured from a flexible material such that when the light emitting head is positioned within said aperture and said flange pressed against the non-porous surface, said flange builds a suction force securing said flange to the non-porous surface.

8. The adhesive shroud of claim 3, wherein the surface is non-porous, wherein said flange is generally bowl shaped and manufactured from a flexible material such that when said flange pressed against the non-porous surface, said flange builds a suction force securing said flange to the non-porous surface.

* * * * *